United States Patent Office.

J. B. POSADA, OF NEW YORK, N. Y.

Letters Patent No. 90,301, dated May 18, 1869.

IMPROVED PROCESS OF TREATING TOBACCO.

The Schedule referred to in these Letters Patent and making part of the same.

*To all whom it may concern:*

Be it known that I, J. B. POSADA, of the city, county, and State of New York, United States of America, have invented an Improvement in the Manufacture of Tobacco; and do hereby declare that the following is a general description thereof, which will enable others skilled in the art to manipulate and produce the same.

The nature of my invention consists in treating the inferior quality of tobacco raised in the United States and other countries in such manner as to render the same, when converted into cigarets, ordinary cigars, or for smoking in pipes, or for snuff, equal, if not superior, to the best Cuban tobacco, when used for such purposes, by extracting from the tobacco-leaf the nicotine and other deleterious substances, and replacing the nicotine by an infusion of extract of Cuban tobacco, Barcelona wine, and the juice of China oranges; and this I accomplish in the following manner:

In the first place, I immerse the tobacco-leaf to be treated in boiling water for about the space of five minutes, or until all the sweet element that is contained in the fibres of the leaves, known as nicotine, is extracted.

Second, I suspend the tobacco-leaves stems downward, and allow them to dry, and I sprinkle them carefully with a mixture of extract of Cuban tobacco-stems and liorice-paste, in about the proportion of one of the latter to twelve of the former. This operation produces an elasticity and flexibility in the tobacco-leaf which prevents its breaking in after handling.

Third, I next place the tobacco-leaves in large heaps, with the stem-ends upward, and I sprinkle them anew alternately, or one after another, with an extract (obtained by distillation) of Cuban tobacco, pure water, red Barcelona wine, and the juice of China oranges, the sweet substance of the latter giving to the tobacco-leaves a delicious flavor, and a pliability which facilitates manufacture of the leaf into cigars, &c.; and Fourth, I place the tobacco-leaves so treated, in large piles, and I cover them up, in order to produce fermentation and prevent evapotation of the aroma, and allow them to remain about twenty days, more or less, according to the thickness and coarseness of the leaf, (a fine leaf requiring less time than a coarse one,) when my improved tobacco is ready for use; and thus I not only improve the quality of inferior tobacco, but change its color and impart to it an aroma and taste equal to the best Havana tobacco.

As a tobacco-manufacturer, experience taught me that the use of ingredients containing alcohol and essential oils, as at present employed in the treatment of tobacco, tended to alter its normal condition, discolor, induce decay, and destroy the natural aroma of the tobacco-leaf; and to obviate these defects suggested to me the process and production of improved tobacco herein set forth.

Having described the nature of my invention,

What I claim, and desire to secure by Letters Patent, is—

1. Extracting the nicotine from the tobacco-leaf by immersing the same in boiling water, substantially as set forth and described.

2. Impregnating the tobacco-leaf with the aromatic ingredients herein specified, and general treatment thereof, substantially as and for the purposes described and set forth.

In testimony whereof, I have hereunto set my signature, this 7th day of April, A. D. 1869.

J. B. POSADA.

Witnesses:
JOHN GALLAGHER,
A. NEILL.